INVENTOR:
Charles S. Barrell
BY Harry T. Williams
ATTORNEY

Patented Feb. 25, 1930

1,748,273

UNITED STATES PATENT OFFICE

CHARLES S. BARRELL, OF BOSTON, MASSACHUSETTS

INTERNAL-COMBUSTION ENGINE

Original application filed August 21, 1919, Serial No. 318,861, Patent No. 1,710,083. Divided and this application filed October 28, 1925. Serial No. 65,327.

The invention to be hereinafter described relates to internal combustion engines, and more particularly to such engines of the two-cycle type.

It has been proposed to construct an engine of this type comprising a cylinder containing primary and secondary pistons. The primary piston is connected by a rod and crank with the shaft of the engine, and the secondary piston is operatively connected with a cam on said shaft. The construction is such that on the in-stroke of the secondary piston, the fuel charge is drawn into the space in the cylinder between the secondary piston and the head of the cylinder, and on the out-stroke thereof, the charge is transferred to the space between the pistons, where it is compressed and exploded to produce the power stroke of the the primary piston. Then the next in-stroke of the secondary piston serves to scavenge out the burnt gases from the cylinder through the exhaust port.

There are certain objections to this type of engine as hitherto designed. Among others, the force of the explosion of the fuel charge reacting on the secondary piston has been transmitted to the actuating cam therefor, thereby producing objectionable friction, shock and wear on the cam and the parts connecting the same with the secondary piston. One of the purposes of the present invention, therefore, is to provide a suitable backing or support for the secondary piston during the explosion of the fuel charge, the construction being such that the secondary piston engages the cylinder head uniformly, and the pressure of the explosion is desirably distributed by the secondary piston to the cylinder head, and the cam and the parts connecting the same with the secondary piston are relieved from the shock of the explosion.

It has been proposed to provide valves in the secondary piston through which the fuel charge drawn into the cylinder by said piston may be transferred to the space between the pistons. Since these valves are necessarily exposed to the products of combustion of the fuel charge, they are liable to become carbonized and permit more or less leakage from the space between the pistons to the space between the secondary piston and the head of the cylinder, and thence through the opening in the cylinder head through which the stem for the secondary piston projects. Another object of the invention is to provide means for preventing leakage along the stem of the piston.

Another object of the invention is to provide an engine having a plurality of cylinders with the secondary pistons thereof connected with and actuated by the same cam, thereby contributing to the compactness, simplicity and efficiency of the engine.

With the aforesaid and other objects in view, the character of the invention may be best understood by reference to the following description of one good form thereof, shown in the accompanying drawings, wherein.

Figure 3:
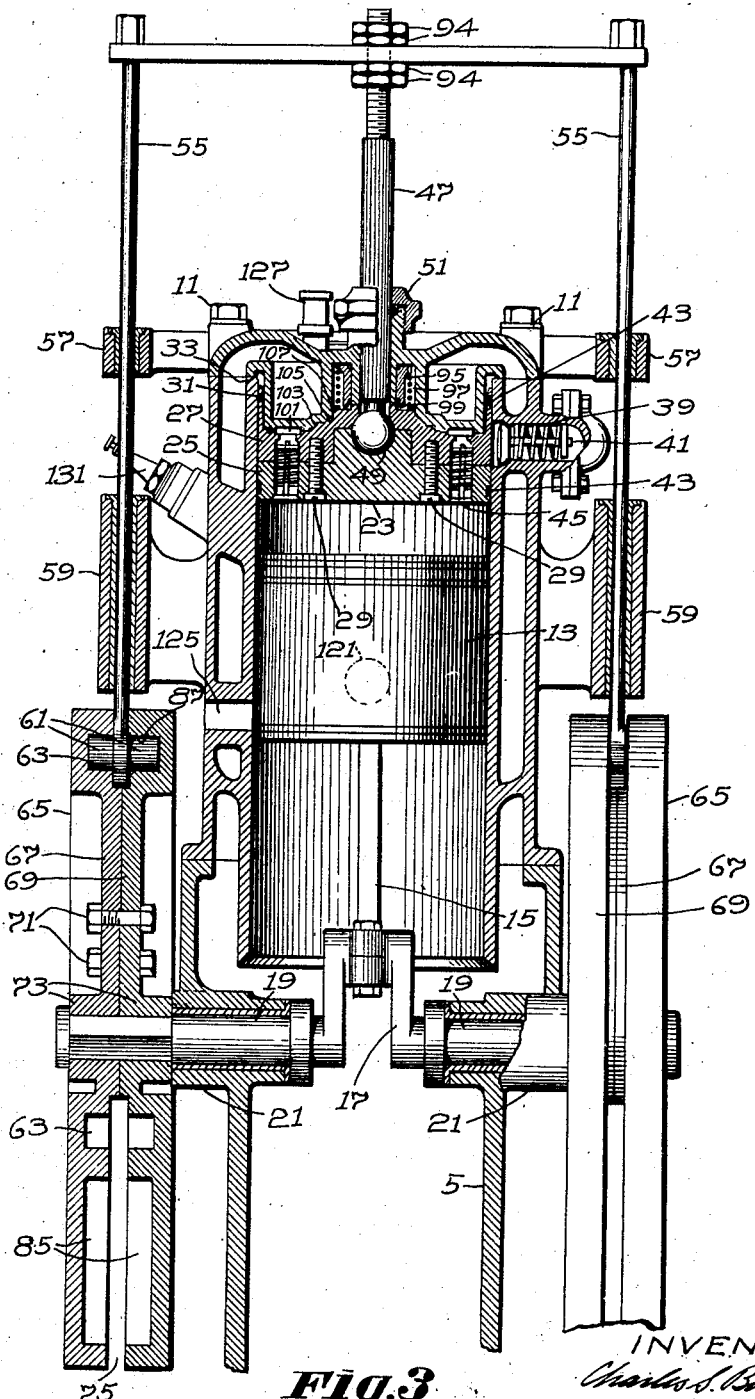
Figure 4:
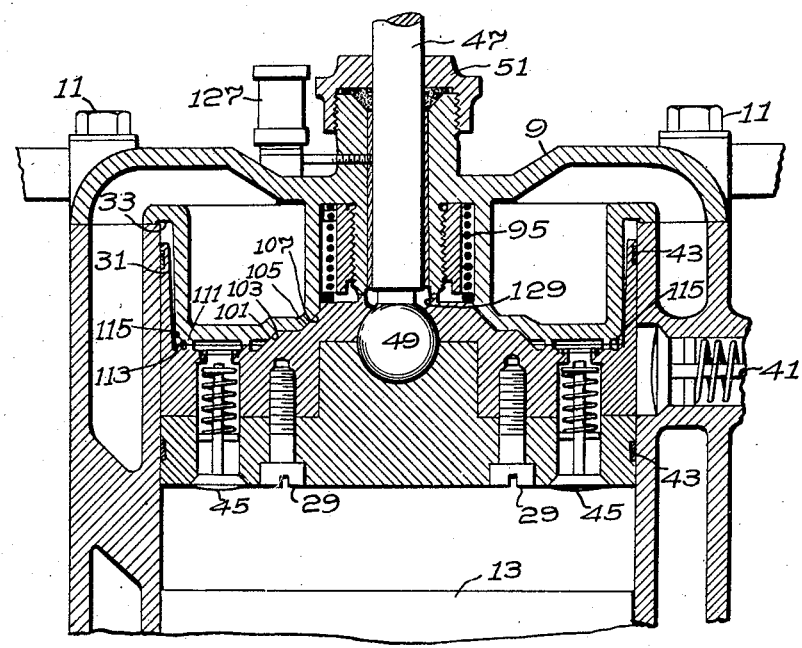
Figure 5:
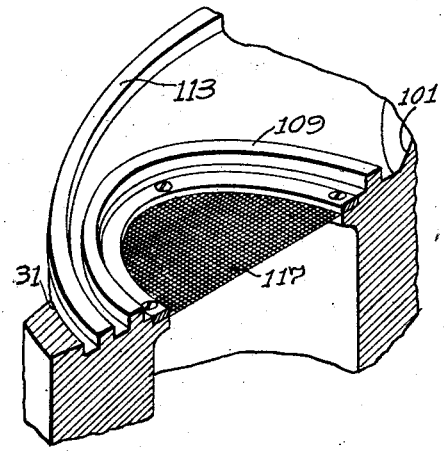
Figure 6:
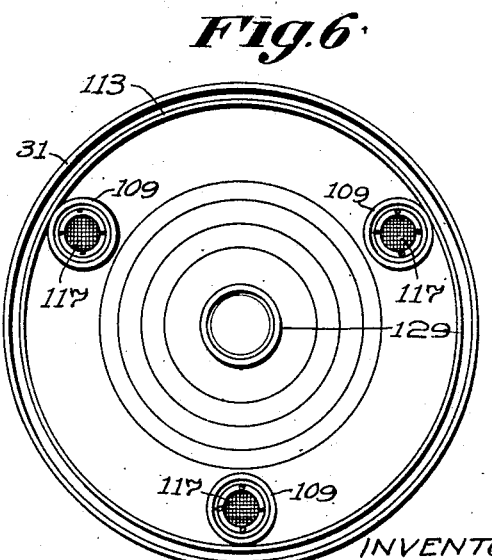

Fig. 3 on an enlarged scale is a vertical section through one of the cylinders of the engine;

Fig. 4 on an enlarged scale is a vertical section through a portion of one of the cylinders;

Fig. 5 on an enlarged scale is a perspective view of a portion of the secondary piston, parts thereof being shown in section; and Fig. 6 on an enlarged scale is a plan of the secondary piston.

Figure 1:
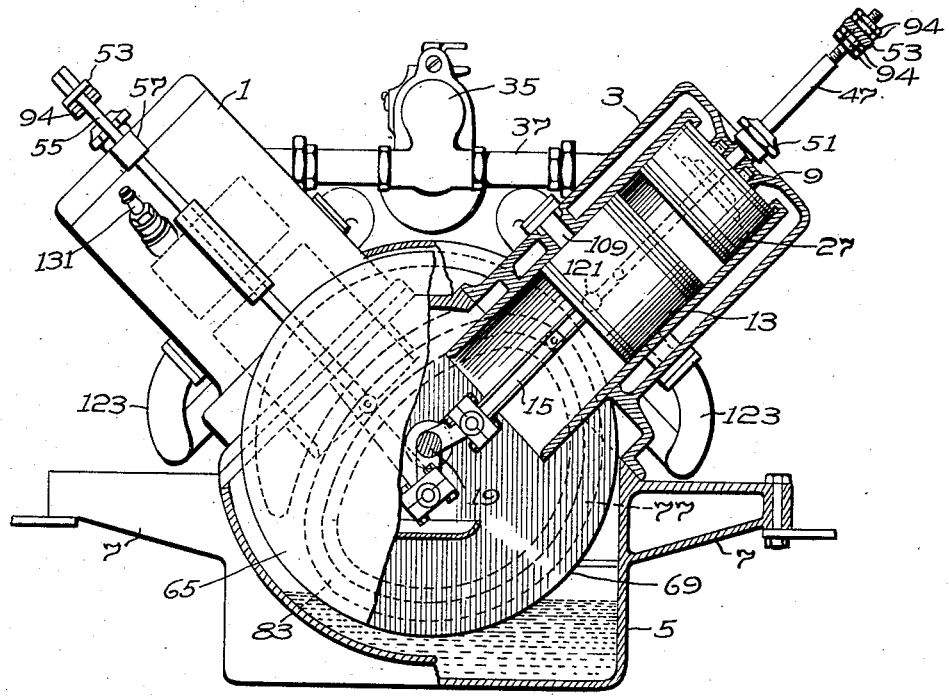
Figure 1 is a view partly in vertical section and partly in end elevation of a plural cylinder two-cycle engine embodying the invention.

The engine may have any number of cylinders, but in the present instance, two cylinders or units 1 and 3 (Fig. 1) are shown conveniently disposed at a V-angle with respect to one another and mounted on and connected by a casing 5 provided with brackets 7 for supporting the engine on the chassis of an automobile or other support. Since these cylinders or units are similar, a description of one will suffice for both.

The cylinder 1, for example, may be provided with a head 9 (Figs. 3 and 4) detachably secured thereto by screw bolts 11, the walls of the cylinder and head being formed hollow to provide the usual water jacket. The cylinder contains a primary piston 13 which may be connected by a rod 15 with a crank 17 on the shaft 19 journalled in suitable bearings 21 in the casing 5, referred to.

The cylinder also contains a secondary piston 23, in the present instance, formed of two parts 25 and 27 secured together by screws 29. The outer part of the piston may have a flange 31 adapted to project into an annular recess 33 formed in the head of the cylinder.

The fuel may be conducted from the carburetor 35 (Fig. 1) through an intake pipe 37 communicating with the port 39 in the cylinder, said port being provided with a spring-pressed puppet valve 41.

The intake valve is located in the cylinder adjacent the head thereof in a position such that it is covered by the secondary piston when the latter is in its outermost position. To prevent leakage of the gases of combustion from the space between the pistons outward along the inner wall of the cylinder to the inlet valve and to the carburetor, the secondary piston may be provided with suitable leak-preventing means, such, for example, as packing rings 43 which will be at opposite sides of the inlet valve when the secondary piston is in its outermost position, as will be noted in Fig. 3.

On the in-stroke of the secondary piston, a fuel charge will be drawn from the carburetor past the inlet valve into the space between the secondary piston and the head of the cylinder. On the outward stroke of the secondary piston the fuel charge thus drawn in, is transferred to the space between the pistons. Suitable means may be provided for this purpose, in the present instance of the invention, in the form of a plurality of spring-pressed puppet valves 45 mounted in and carried by the secondary piston, the construction being such that these valves will automatically remain on their seats on the in-stroke of the secondary piston, but will move from their seats on the out-stroke thereof to allow the fuel charge to pass into the space between the pistons.

Next will be described means for actuating the secondary piston. In the present instance, this means comprises a stem 47 having one end thereof suitably connected to the secondary piston, this connection being preferably by a universal joint which may be in the form of a ball 49 seated in a socket formed in the parts 25 and 27 of the secondary piston. The stem 47 projects outward through the head of the cylinder, a suitable stuffing box 51 being provided to prevent leakage from the cylinder along the stem. Adjacent the outer end of the stem is a cross bar or member 53 connected to the outer ends of rods 55 which pass inward through suitable guides 57 and 59 projecting laterally from the head and cylinder. The inner ends of the rods 55 may be provided with studs having rollers 61 working in camways 63 in a cam 65. In the present instance of the invention, each cam comprises two parts 67 and 69 detachably secured together by bolts 71, and having bosses 73 fast on the crank shaft 19, referred to.

The construction is such that opposed camways are provided in the parts of the cam adapted to receive the rollers on the opposite ends of the studs carried by the rods 55, and the latter project through spaces 75 between the cam parts. As a consequence, a strong cam construction is provided for efficiently reciprocating the secondary piston.

Figure 2:
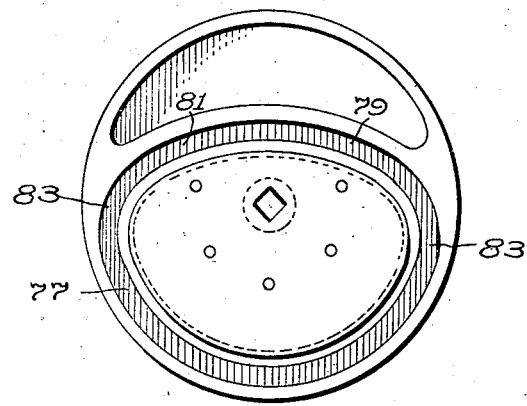
Fig. 2 is a side elevation of one of the cams for actuating the secondary piston.

The camway comprises a portion 77 (Fig. 2) of uniform radius extending nearly through an arc of 180°, a portion 79 of varying radius for rapidly producing the in-stroke of the secondary piston, and a portion 81 for rapidly producing the out-stroke of said piston. The portion 77 meets the portions 79 and 81 through portions 83 which may be gradually curved to reduce friction between the rollers and the camway as much as possible. It will be noted that the camway is located eccentrically with respect to the crank shaft, and therefore, to avoid a greater mass of material at one side of the cam than the other, recesses 85 (Fig. 3) are formed in the cam to produce a balanced construction which will have a uniform rotary motion.

While each of the cams, in the present instance, is formed of two parts containing opposed camways, it will be understood that in some cases a cam may be provided having a single camway. Also, in some cases a single cam may be provided for reciprocating the secondary piston if desired, instead of cams at the opposite sides of the cylinder as shown herein.

As stated, an important feature of the invention consists in means for relieving the cam or cams from the shock due to the reactive force of the explosion on the secondary piston. To accomplish this, in the present instance, the secondary piston is caused to engage the head of the cylinder during the explosion of the fuel charge, so that the reactive force will be transmitted from the secondary piston to the head of the cylinder instead of to the cam or cams through the connections between the latter and the secondary piston. The secondary piston will engage the head of the cylinder while the cam follower rollers 61 are working in the portion 77 of the camway having a uniform radius.

It is desirable to provide adjustable means in the connections between the cams and the secondary piston in order that the latter may seat properly against the cylinder head when the secondary piston is at the outward limit of its stroke without strain on or injury to the connections between the cams and the secondary piston. To accomplish this, in the present instance of the invention, the piston stem 47 has a portion projecting through the bar 53, and nuts 94 are threaded on the stem and engage opposite sides of the bar. These nuts may be adjusted to vary the effective length of the piston stem as required.

In some instances it may be desirable to provide means for cushioning the secondary piston as it approaches the head of the cylinder. For this purpose, in the present form of the invention, a coil spring 95 is provided mounted in an annular recess 97 in the cylinder head, the inner end of said spring being suitably anchored in said recess, and the outer end of said spring being provided with a cap 99 for engagement with the secondary piston.

Next will be described means for preventing loss of power from the explosions in case the valves 45 in the secondary piston become carbonized and leak. This means, in the present instance, comprises a conical projection 101 on the secondary piston adapted to tightly seat against a conical recess 103 in the cylinder head, the angle of said projection and recess being of sufficient degree to insure tight engagement thereof without wedging of the projection in said recess so as to interfere with ready movement of the piston away from the head. The seal thus provided is located between the valves 45 and the piston stem 47. As a consequnece, any leakage past said valves will be unable to escape to and along said stem. To further contribute to the prevention of the leakage referred to, the piston and cylinder head may be provided with a conical projection 105 and a conical recess 107 similar to the projection and recess described, and located radially inward therefrom, although this second sealing means is not indispensable.

To further contribute to prevention of leakage, the secondary piston may be provided with upstanding circular seats or rings 109 (Figs. 5 and 6) on its upper surface surrounding the valve ports and adapted to engage similar seats or rings 111 (Fig. 4) on the inner surface of the cylinder head. Preferably three valves are employed in the secondary piston, and since each valve is provided with rings as described, the secondary piston will seat against the cylinder head at three points. This will tend to insure tight engagement of all three rings of the piston with all three rings of the cylinder head. To further prevent any possibility of such leakage, the piston may be provided with an upstanding ring 113 at the upper surface thereof encircling and outside of the three rings for the valve ports, and adapted to engage a similar ring 115 on the inner face of the cylinder head encircling all three rings on the cylinder head.

It is important that on explosion of the charge between the pistons there should be no back fire such as might ignite the fresh fuel charge drawn in by the secondary piston between the latter and the cylinder head. Suitable means may be provided to prevent such occurrence, and in the present instance, each of the valve ports may be covered by a gauze diaphragm 117 (Fig. 5) suitably secured to the piston.

To facilitate removal of carbon deposits on the inner faces of the pistons, two diametrically opposed exhaust ports 121 (Fig. 1) may be employed, the construction being such that the pipe connections 123 for the exhaust ports may be removed, and then one can look through one of the exhaust ports while a tool is inserted through the opposite exhaust port and mainpulated to scrape the carbon from the pistons.

After the explosion of a charge between the pistons, the secondary piston is moved quickly downward to scavenge or drive out the burnt gases. The rapid exit of said gases from the cylinder will produce a partial vacuum therein. To insure a fresh unadulterated new charge in the explosion space, an air admission port 125 may be provided in the cylinder at a point beneath the exhaust ports, so that as the primary piston moves downwardly, it will first uncover the exhaust ports to allow escape of the burnt gases, and then fresh air may be drawn in through the air port by the vacuum and follow the burnt gases out through the exhaust port, thereby insuring the complete discharge of all burnt gases. When the primary piston moves upward, it will first close the air port and then close the exhaust ports. The secondary piston, however, is moved upwardly more rapidly than the primary piston, so that the fresh charge will be transferred from the space between the secondary piston and the cylinder head into the space between the two pistons, and this fresh charge will not be adulterated by any residual burnt gases in the space between the pistons.

To provide lubricant for the stem of the secondary piston, a grease cup 127 may be mounted on the cylinder head and feed lubricant to the portion of the stem which reciprocates through the head. This lubricant may gravitate downward along the stem toward the ball of the universal joint at the lower end of the stem. The piston may have a circular groove 129 adjacent the stem to catch lubricant and guide the same inward toward the ball on the end of the stem.

A spark plug 131 (Figs. 1 and 3) may be connected to the cylinder at a point to ignite the compressed fuel charge between the pistons.

As shown herein, two cylinders are provided, disposed at a V-angle, and one cam may serve both cylinders, since a plurality of followers may work on the same cam and have connections leading therefrom to the secondary pistons of the cylinders. While two cylinders are shown herein, it will be understood that the engine might have four or more cylinders, all served by the same cam if desired.

The construction of the camway of the cam for reciprocating the secondary piston is such that said piston is moved quickly downward away from the head of the cylinder and quickly back toward said head. The radii of progressive points of the camway for moving said piston down and up rapidly, vary considerably in length until the piston almost reaches the head of the cylinder, and is, for example, about one-half inch from said head. The radii of progressive points on the camway in moving the piston through this final one-half inch distance, vary but slightly. As a consequence, the piston is slowly moved by the cam through this last one-half inch distance to the head of the cylinder, and pounding of the piston against the head of the cylinder is prevented. The piston is thus seated against the head of the cylinder, and the reactive force of the explosion is borne by the head of the cylinder rather than the connections between the secondary piston and the actuating cam therefor.

In operation, the secondary piston will be moved downward to draw a fuel charge through the inlet port into the space between the secondary piston and the cylinder head, and in the course of this movement will scavenge out the burnt gases resulting from the previous explosion. Then the secondary piston will move upward and force the fuel charge thus drawn in past the valves 45 into the space between the pistons. The primary piston will follow the secondary piston in its upward movement and compress the fuel charge between them, said charge being then ignited, and causing the power stroke of the primary piston. During the explosion of the charge the secondary piston will remain seated against the head of the cylinder, so that the reactive force of the explosion will be transmitted from the secondary piston to the cylinder head, and not to the actuating cam therefor.

It will be understood that the invention is not limited to the specific embodiment shown, and that various deviations may be made therefrom without departing from the spirit and scope of the appended claims.

The present application is a division from my copending application Serial No. 318,861, filed August 21, 1919.

What is claimed is:—

1. A two-cycle internal combustion engine, comprising, in combination, a cylinder, primary and secondary pistons therein, a stem connected to said secondary piston extending through the cylinder head, and valve means for transferring the fuel charge from a chamber at one side of said secondary piston to the opposite side thereof, said secondary piston and the head of the cylinder having provision for inter-engagement to prevent leakage from said valve means along said stem during explosion of the fuel charge.

2. A two-cycle internal combustion engine, comprising, in combination, a cylinder, primary and secondary pistons therein, a stem connected to said secondary piston extending through the cylinder head, a stuffing box for said stem, valve means for transferring the fuel charge from a chamber at one side of the secondary piston to the opposite side thereof, and means positioned by the secondary piston to prevent leakage along the stem and through said stuffing box during explosion of the fuel charge.

3. A two-cycle internal combustion engine, comprising, in combination, a cylinder, primary and secondary pistons therein, a stem connected to said secondary piston extending through the cylinder head, valve means on said secondary piston for transferring the fuel charge from one side of said secondary piston to the other side thereof, and seats on said secondary piston and cylinder head interposed between said valve means and piston stem to prevent any loss of compression or fluid leakage through said valve means and along said stem.

4. A two-cycle internal combustion engine, comprising, in combination, a cylinder having a head, primary and secondary pistons, a shaft rotated by said primary piston, cam means driven by said shaft, connecting means between said cam means and secondary piston to reciprocate the latter toward and away from said head, and means between the head of the cylinder and the secondary piston for cushioning the latter on its movement toward the limit of its outward stroke.

5. A two-cycle internal combustion engine, comprising, in combination, a cylinder having a closed head, primary and secondary pistons in the cylinder, valve ports in said secondary piston to admit fuel charges from the space between the secondary piston and the cylinder head to the space between the pistons, and a member surrounding each port on the secondary piston for engagement with parts of said head to prevent leakage between them.

6. A two-cycle internal combustion engine, comprising, in combination, a cylinder, primary and secondary pistons therein, a stem for said secondary piston projecting through the cylinder head, and having a ball seated in a socket in the secondary piston, and lubricant supply means to admit lubricant to said stem and along the latter to said ball and socket.

7. A two-cycle internal combustion engine, comprising, in combination, a cylinder having a closed head, primary and secondary pistons in said cylinder, a shaft rotated by the primary piston, means operated by said shaft for reciprocating the secondary piston toward and away from said head, and spring means between the head of the cylinder and the secondary piston for cushioning the latter on its movement towards the limit of its outward stroke.

8. A two-cycle internal combustion engine, comprising, in combination, a cylinder having a closed head, primary and secondary pistons therein, a stem connected to the secondary piston extending through the cylinder head, means cooperating with said stem for reciprocating the secondary piston toward and away from the head, and valve means for transferring the fuel charge from one side thereof to the other, said secondary piston and the head of the cylinder being provided with inter-engaging tapered seats to prevent leakage of the gases from the combustion chamber to said stem during explosion of the fuel charge.

9. A two-cycle internal combustion engine, comprising, in combination, a cylinder having a head, primary and secondary pistons in said cylinder, a shaft rotated by the primary piston, a grooved cam secured to said shaft, a follower slidably engaging the cam groove, a stem connected to the secondary piston, and means connected to said stem and follower to reciprocate the secondary piston, said cam groove having a portion of uniform and relatively large radius extending through substantially a semi-circle, a portion of varying radius, and oppositely disposed gradually rounded portions connecting the portions of uniform and varying radius, one of said portions causing the secondary piston gradually to approach and seat against the head of the cyinder.

10. A two-cycle internal combustion engine, comprising, in combination, a cylinder, a primary piston therein, a secondary piston therein formed of two parts secured together and having a ball socket therebetween, a stem for imparting movement to the secondary piston and having a ball end confined by said parts within said socket, and means for imparting movement to said stem.

11. A two-cycle internal combustion engine, comprising, in combination, a cylinder, a primary piston therein, a secondary piston therein comprising a pair of heads secured together and having a ball socket between them, a stem for imparting movement to the secondary piston and having a rounded head confined by said heads within said socket, and means for imparting movement to said stem.

12. A two-cycle internal combustion engine, comprising, in combination, a cylinder, a piston therein comprising a pair of heads secured together and having a ball socket between them, and a stem for said piston having a rounded head confined by said heads within said socket.

13. A two-cycle internal combustion engine, comprising, in combination, a cylinder, a primary piston therein, a secondary piston therein formed of two parts secured together and provided with a socket, a stem for imparting movement to the secondary piston and having a rounded end confined by said parts within said socket, a crank shaft operatively connected to the primary piston, and means for operating the stem from said crank shaft.

14. A two-cycle internal combustion engine, comprising, in combination, a cylinder, primary and secondary pistons therein, means including a stem for imparting movement to the secondary piston, and having a universal joint connection with said secondary piston to permit the latter to seat uniformly against the head of the cylinder when at the outward limit of its stroke.

15. A two-cycle internal combustion engine, comprising, in combination, a cylinder, primary and secondary pistons therein, and means for reciprocating the secondary piston including a stem having a terminal ball, said secondary piston being provided with a socket to receive said ball to enable the secondary piston to seat uniformly against the head of the cylinder when at the outward limit of its stroke.

16. A two-cycle internal combustion engine, comprising, in combination, a cylinder, primary and secondary pistons therein, and means for reciprocating the secondary piston including a stem pivotally connected to the secondary piston, thereby to enable the latter to seat uniformly against the cylinder head when at the outer limit of its stroke.

17. A two-cycle internal combustion engine, comprising, in combination, a cylinder having a closed head, primary and secondary pistons therein, means for reciprocating the secondary piston including a stem extending through said head, said means having provision for moving the secondary piston into engagement with the cylinder head, means for transferring the fuel charge from the space between the secondary piston and the cylinder head to the space between the pistons, said secondary piston and cylinder head having provision enabling the secondary piston to seat uniformly against the head, thereby to prevent strains tending to destroy axial alinement of the secondary piston with respect to the cylinder on explosion of the fuel charges.

18. A two-cycle internal combustion engine, comprising, in combination, a cylinder, primary and secondary pistons therein, means for reciprocating the secondary piston including a stem connected to the secondary piston and projecting through the cylinder head, and means for transferring the fuel charge from the space between the secondary piston and the cylinder head to the space between the pistons, said secondary piston and the cylinder head being constructed and arranged for the secondary piston to seat against the cylinder head and prevent leakage of the gases of explosion from the cylinder through the opening of the cylinder head receiving the stem.

19. A two-cycle internal combustion engine, comprising, in combination, a cylinder, primary and secondary pistons therein, and means for reciprocating the secondary piston including a stem connected to the secondary piston and projecting through the cylinder head, and means for transferring the fuel charge from the space between the secondary piston and the cylinder head to the space between the pistons, said secondary piston and head having portions constructed and arranged for engagement to prevent leakage from the cylinder through the opening in the cylinder head receiving the piston stem.

20. A two-cycle internal combustion engine, comprising, in combination, a cylinder having a head, primary and secondary pistons in said cylinder, a shaft, a crank on said shaft, a rod connecting said crank to the primary piston, a cam rotated by said shaft having a groove therein, and connections between the cam groove and secondary piston, said groove having a portion of uniform and relatively large radius, a portion of varying radius and gradually curved portions connecting the portions of uniform and varying radius, one of said portions for causing the secondary piston gradually to approach and seat against the cylinder head without pounding the same.

21. A two-cycle internal combustion engine, comprising, in combination, a cylinder having a head, primary and secondary pistons in said cylinder, means for reciprocating the secondary piston including a cam having a follower, a member connected to said follower, a stem connected to the secondary piston, and means connecting said member and stem having provision relatively to adjust the same to enable the cam to seat the secondary piston against the cylinder head without pounding the same.

22. A two-cycle internal combustion engine, comprising, in combination, a cylinder having a head, primary and secondary pistons in said cylinder, and means for imparting reciprocatory movements to the secondary piston including a cam, a follower, and connections between the follower and secondary piston having means for adjusting the effective length of the connections in order that the secondary piston may seat against the head of the cylinder when at the outward limit of its stroke.

23. A two-cycle internal combustion engine, comprising, in combination, a cylinder, primary and secondary pistons therein, means for reciprocating the secondary piston, and means for transferring a fuel charge from the space between the secondary piston and the cylinder head to the space between the pistons, said means for reciprocating the secondary piston having provision for moving the secondary piston into engagement with the cylinder head without pounding the same when at the outward limit of the stroke of the secondary piston.

24. A two-cycle internal combustion engine, comprising, in combination, a cylinder having a head, primary and secondary pistons therein, and means for reciprocating the secondary piston including a cam and connections having adjustable means for varying the effective length thereof, that the secondary piston may seat against the cylinder head when at the outer limit of its stroke.

25. A two-cycle internal combustion engine, comprising, in combination, a plurality of cylinders, each having a closed head and primary and secondary pistons therein, a shaft, means connecting the primary pistons with said shaft, a cam driven by said shaft, and connections between the cam and the secondary pistons, said cam having a portion of varying radius for moving the secondary pistons into and out of engagement with their cylinder heads and a portion of uniform radius for causing the secondary pistons to seat and dwell against the cylinder heads at the outer limits of their strokes.

26. A two-cycle internal combustion engine, comprising, in combination, a plurality of angularly related cylinders, each having a closed head and primary and secondary pistons therein, a shaft, cranks on said shafts, rods connecting said cranks with said primary pistons, a cam driven by said shaft, followers for said cam, and members connecting said followers with the secondary pistons, said cam having a portion of varying radius for reciprocating the secondary pistons and a portion of uniform radius for causing the secondary pistons to seat and dwell against the cylinder heads when at the outer limits of their strokes.

27. A two-cycle internal combustion engine, comprising, in combination, a plurality of angularly related cylinders, each having a closed head and primary and secondary pistons therein, a shaft, means connecting the primary pistons with said shaft for rotating the latter, a cam driven by said shaft, and means to impart movements from the cam to the secondary pistons, said cam having a portion of varying radius for moving the secondary pistons to and from their cylinder heads and a portion of uniform radius for causing the secondary pistons to dwell in engagement with the cylinder heads.

28. A two-cycle internal combustion engine, comprising, in combination, a plurality of angularly related cylinders, each having a closed head and primary and secondary pistons therein, a shaft, cranks on said shaft, rods connecting the cranks with the secondary pistons, cams driven by said shaft, and connections between said cams and the secondary pistons, said cams having portions of varying radius for reciprocating the secondary pistons and portions of uniform radius for causing the secondary pistons to seat and dwell against the cylinder heads when at the outer limits of their strokes.

29. A two-cycle internal combustion engine, comprising, in combination, a plurality of angularly related cylinders, each having a closed head and primary and secondary pistons therein, a shaft, cranks on said shaft, cams driven by said shaft, followers for said cams, stems connected to the secondary pistons, bars for said stems, rods connecting the bars with the cam followers, and guides for said rods mounted on the cylinders externally thereof, said cams being formed to reciprocate the secondary pistons to and away from the cylinder heads.

CHARLES S. BARRELL.